US009191424B1

(12) United States Patent
Fernandes et al.

(10) Patent No.: US 9,191,424 B1
(45) Date of Patent: Nov. 17, 2015

(54) MEDIA CAPTURE DURING MESSAGE GENERATION

(75) Inventors: Roshan Fernandes, Mountain View, CA (US); Bindu Mary Oommen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 206 days.

(21) Appl. No.: 13/303,787

(22) Filed: Nov. 23, 2011

(51) Int. Cl.
*G06F 15/16* (2006.01)
*H04L 29/06* (2006.01)
*H04L 12/24* (2006.01)

(52) U.S. Cl.
CPC ........... *H04L 65/4061* (2013.01); *H04L 41/082* (2013.01)

(58) Field of Classification Search
USPC .................. 709/206, 201, 202, 203, 232, 236
See application file for complete search history.

(56) References Cited

U.S. PATENT DOCUMENTS

| 2004/0172595 | A1* | 9/2004 | Lerner et al. ................... 715/512 |
| 2006/0288389 | A1* | 12/2006 | Deutscher et al. .............. 725/88 |
| 2007/0188657 | A1* | 8/2007 | Basson et al. .................. 348/468 |
| 2009/0013086 | A1* | 1/2009 | Greenbaum .................... 709/231 |
| 2009/0157750 | A1* | 6/2009 | Kim et al. .................... 707/104.1 |
| 2011/0197236 | A1* | 8/2011 | Rao .................................. 725/74 |
| 2011/0207482 | A1* | 8/2011 | Shamma et al. ............... 455/466 |
| 2012/0236201 | A1* | 9/2012 | Larsen et al. .................. 348/468 |
| 2013/0159412 | A1* | 6/2013 | Robinson et al. .............. 709/204 |
| 2014/0111547 | A1* | 4/2014 | Bilbrey et al. ................. 345/633 |

OTHER PUBLICATIONS

The Red Ferret Journal. Voice-Mail Audio Email Sender—record and send voice email messages instead of typing them. http://www.redferret.net/ Last accessed Jun. 16, 2008.

* cited by examiner

*Primary Examiner* — Lan-Dai T Truong
(74) *Attorney, Agent, or Firm* — Lowenstein Sandler LLP

(57) ABSTRACT

This disclosure relates to media capture during generation of a message. A media capture component can receive user input to initiate capture of media information during generation of the message. The media capture component can identify hardware available for capturing the media information, and acquire the media information using the identified hardware. An integration component can integrate the captured media information with the message, and a transmission component can transmit the message and integrated captured media information.

26 Claims, 11 Drawing Sheets

MEDIA CAPTURE DURING MESSAGE GENERATION

TECHNICAL FIELD

This disclosure generally relates to systems and methods that facilitate media capture during generation of a message.

BACKGROUND

Electronic communication enables people to communicate in a variety of manners. Beyond mere communication, individuals can share media content such as pictures, videos, and audio recordings via electronic communication. In addition, the rapid growth of mobile devices, such as, cell phones, smart phones, laptops, and tablets allows for communication and sharing from virtually anywhere in the world.

Sharing media content can personalize, and increase the value of, electronic communications. However, in order to share content, typically a user must generate and save the content prior to generating a message. For example, conventionally, a user must record him/herself on a video camera. The video is stored on the camera's storage device in one of a variety of video formats. When the user wants to share the video, he/she must transfer the video from the camera's storage device onto a device with hardware and software capable of sharing the video in the desired fashion, if the video is not already located on such a device. The user then must attach the video to an email, or upload the video to a video hosting site and send a link to that video. This can require searching for files on relatively small devices, or waiting through lengthy upload processes. Uploading files can be particularly time consuming when using a mobile device or wireless connection, because of the varying nature of wireless connectivity. Additionally, a recipient of the video, e.g., a user who receives the email attachment, may not want to download the attachment (e.g., because of the time required or concern about viruses). Moreover, even if the recipient downloads the attachment, the recipient's device may not have proper software to view the video.

In addition, electronic communication often requires tremendous amounts of typing, and the ubiquitous nature of mobile devices has lead to typing, and viewing messages and files, using devices that are constantly decreasing in size. For individuals that are not skilled typist, electronic communication can be inconvenient, inaccurate, and/or time consuming. Furthermore, typing messages limits users' ability to generate or transmit a message in certain situations, e.g., while driving.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

According to an aspect of the subject innovation, systems and methods for media capture during message generation are disclosed. A communications component generates a user interface to receive user input to generate and transmit a message. A media capture component receives user input to initiate capture of media information during generation of the message. The media capture component can identify hardware available for capturing the media information, and acquire the media information using the identified hardware. An integration component integrates the captured media information with the message, and a transmission component transmits the message and integrated captured media information to one or more recipients.

In an embodiment, a communications component generates a user interface to receive user input to generate and transmit a message. A media capture component receives user input to initiate capture of media information during generation of the message, and an integration component integrates the captured media information with the message. A transmission component transmits the message and integrated captured media information.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
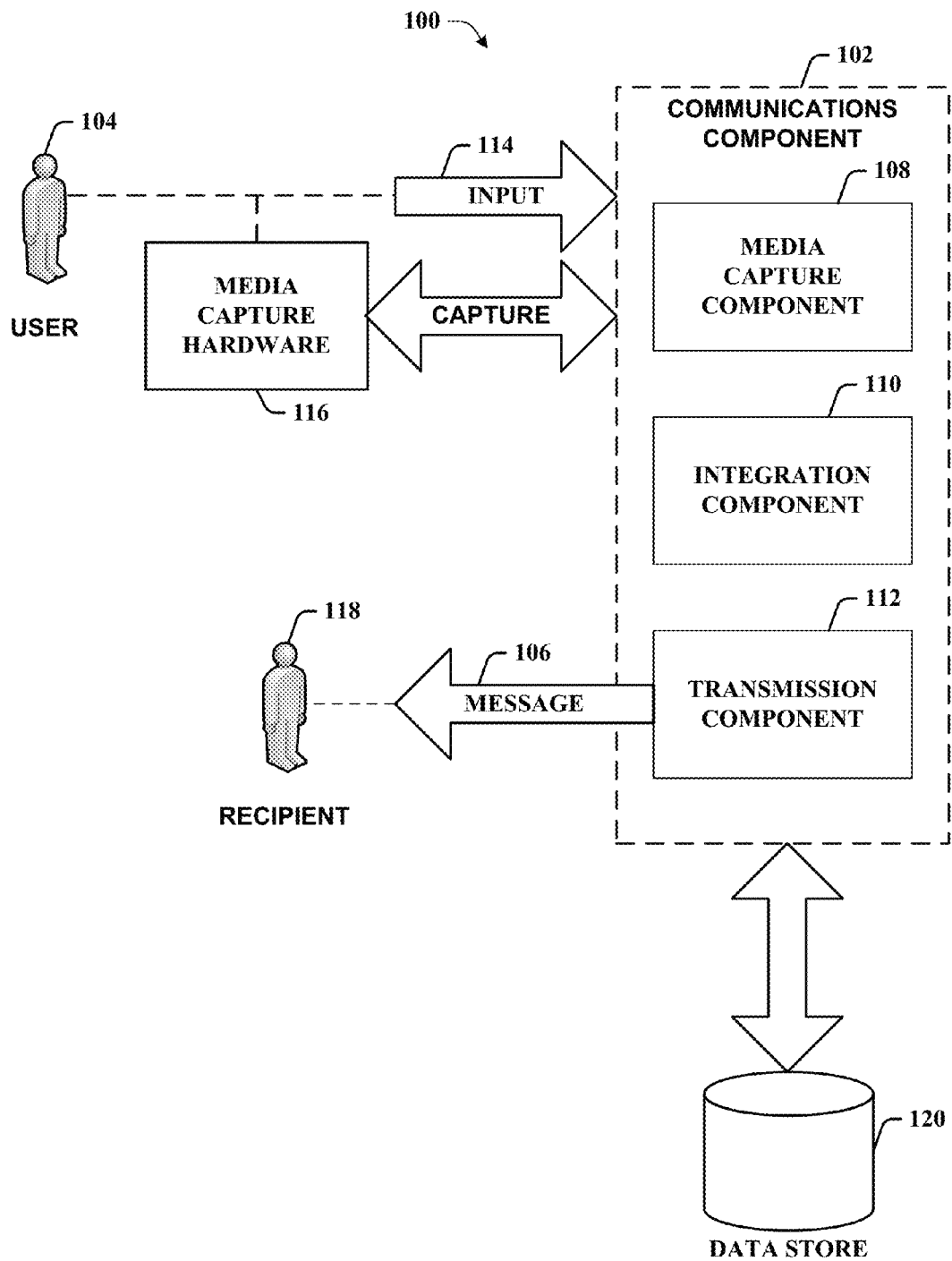
FIG. 1 illustrates an example system for media capture during generation of a message in accordance with various aspects described herein.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As noted in the Background section, techniques for media sharing that require generating and saving content prior to generating a message can be time consuming. In addition, message generation that employs typing as a sole or primary input technique can be time consuming, difficult, and/or inaccurate. Moreover, the ability of users to generate a message by typing can be limited in some situations, e.g., while driving.

One non-limiting implementation of the innovation provides efficient media capture during generation of a message. The implementation reduces the time required to share content by enabling media to be captured during generation of the message, seamlessly as part of the message generation user interface. In addition, audio information in the media can be transcribed and inserted into the message, reducing the necessity for users to input the message by typing.

More particularly, in accordance with an embodiment, a communications component generates a user interface to receive user input to generate and transmit a message, a media capture component receives user input to initiate capture of media information during generation of the message, an integration component integrates the captured media information with the message, and a transmission component transmits the message and integrated captured media information.

Non-Limiting Examples of Media Capture During Message Generation

Turning now to FIG. 1, illustrated is an example system 100 for media capture during generation of a message in accordance with various aspects described in this disclosure. Generally, system 100 can include a memory that stores computer executable components and a processor that executes computer executable components stored in the memory, examples of which can be found with reference to FIG. 11. System 100 includes a communications component 102. The communications component 102 provides, produces, or otherwise generates a user interface to receive user input to generate and transmit a message 106. For example, the message 106 can include, but is not limited to, an electronic mail message (email), an instant message, or a social networking message (e.g., private message, profile message, status message, update, stream, etc.).

The communications component 102 includes a media capture component 108, an integration component 110, and a transmission component 112. The media capture component 108 acquires, obtains, or otherwise receives user input 114 to initiate capture of media information during generation of the message 106. The media information (e.g., media data, media, etc.) can include, but is not limited to, video information (e.g., video data, video recording, video, etc.), audio information (e.g., audio data, audio recording, audio, etc.), or photographic information (e.g., photographic data, picture, etc.). For example, the user 104 can provide user input 114 to initiate capture of audio information during generation of an email via the communications component 102. In response to the user input 114, the media capture component 108 acquires, obtains, or otherwise receives the media information from a set of media capture hardware 116 (e.g., media capture devices, hardware, etc.). The set of media capture hardware 116 can include one or more of virtually any media capture devices, including but not limited to, a microphone, a web cam, a digital camera, a camcorder, and so forth. The set of media capture hardware 116 can be stand-alone hardware, or can be integrated into a user device, such as, a laptop, a desktop computer, a tablet, a net book, a mobile phone, a smart phone, a personal digital assistant (PDA), a portable music player, a video game system, and so forth.

The integration component 110 incorporates, assimilates, or otherwise integrates the captured media information with the message 106. For example, the integration component 110 can attach the captured media information to the message 106. As an additional example, the integration component 110 can store, save, or otherwise maintain the captured media information in a disparate location (e.g., in a data store 120), and provide access to the captured media information in the message 106 (e.g., via a hyperlink, etc).

The transmission component 112 sends, communicates, or otherwise transmits the message 106 and the integrated captured media information to one or more recipients 118. The recipients 118 are designated by the user 104. For example, the user 104 can direct, address, or otherwise send an email to the recipients 118. As an additional example, the user 104 can broadcast, post, or otherwise send a social networking messaging to a set, group, circle, etc. of recipients 118. It is to be appreciated that although the media capture component 108, the integration component 110, and the transmission component 112 are illustrated as being included in the communications component 102, such implementation is not so limited. For instance, the media capture component 108, the integration component 110, and the transmission component 112 can be maintained in disparate or distributed locations, such as, a cloud computing network, or included in a stand-alone application.

Figure 2:
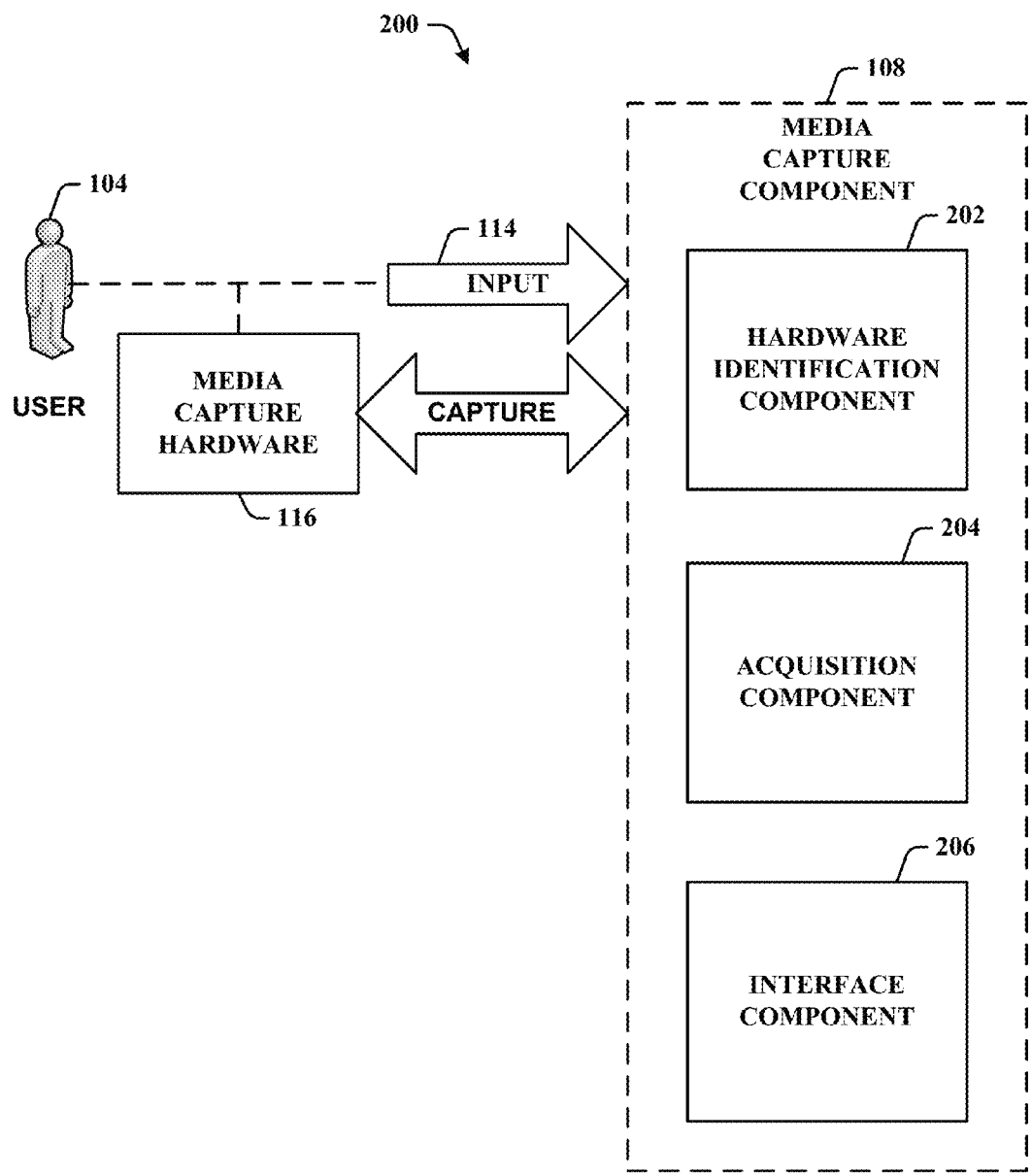
FIG. 2 illustrates an example media capture component in accordance with various aspects described herein.

FIG. 2 illustrates an example media capture component 108 in accordance with various aspects described in this disclosure. As discussed, the media capture component 108 receives user input 114 to initiate capture of media information during generation of the message 106, and in response to the user input 114, the media capture component 108 captures the media information from the set of media capture hardware 116. The media capture component 108 in FIG. 2 includes a hardware identification component 202, an acquisition component 204, and an interface component 206.

The hardware identification component 202 recognizes, detects, or otherwise identifies the set of media capture hardware 116. For example, the hardware identification component 202 can detect an available webcam, identify a configuration of the webcam, protocols for communication with the webcam, and so forth. The hardware identification component 202 can dynamically identify the set of media capture hardware 116, identify the set of media capture hardware 116 based on user input, or identify the set of media capture hardware 116 based on a set of predetermined preferences or previous configurations. For example, the user 104 may have initiated capture of media information during generation of a prior message using a microphone included in the set of media capture hardware 116.

The acquisition component 204 obtains, acquires, or otherwise captures the media information via the identified set of media capture hardware 116. For example, the acquisition component 204 can capture audio information via a microphone, capture video information via a web camera (e.g., webcam), or capture photographic information via a digital camera. The interface component 206 includes any suitable and/or necessary adapters, connectors, channels, communication paths, etc. to enable the media capture component 108 to communicate with suitable operating systems, media capture devices, or software applications. Moreover, the interface component 206 provides various adapters, connectors, channels, communication paths, etc., that provide for interaction with the media capture component 108. For instance, the interface component 206 can facilitate communication with the set of media capture hardware 116 for capturing of media information.

Figure 3:
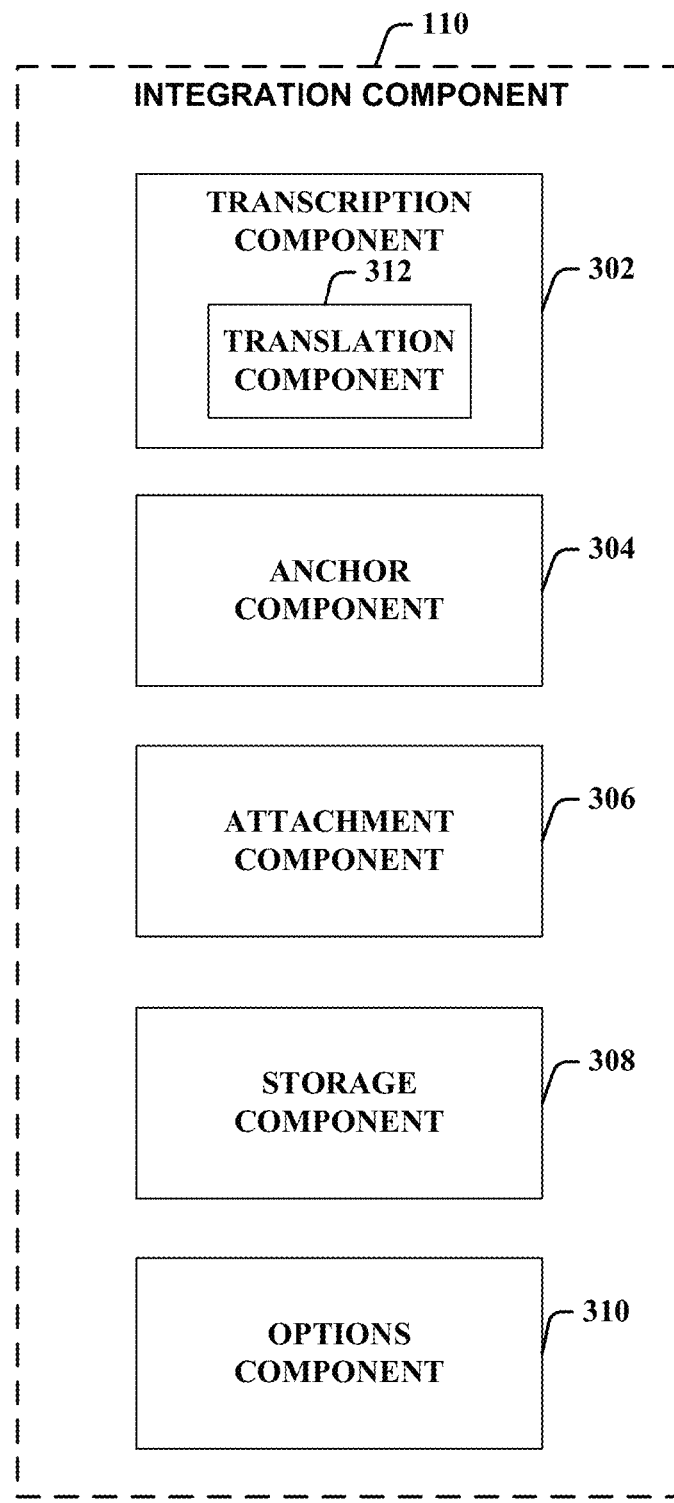
FIG. 3 illustrates an example integration component in accordance with various aspects described herein.

Referring to FIG. 3, illustrated is an example integration component 110 in accordance with various aspects described in this disclosure. As discussed, the integration component 110 integrates the captured media information with the message 106. The integration component 110 in FIG. 3 includes a transcription component 302, an anchor component 304, an attachment component 306, a storage component 308, and an options component 310. The transcription component 302 determines if the captured media information includes audio information, and transcribes the audio information in the captured media to text. For example, the transcription component 302 can convert audio information included in captured video information to text. In addition, the transcription component 302 includes the transcribed text in the message 106. For instance, the user 104 can initially generate a message 106 via the communications component 102 by typing the message 106, and at a first point in the message 106 initiate capture of audio information (e.g., a voice message). The transcription component 302 can transcribe the voice message, and include the transcribed text in the message 106 at the first point.

Furthermore, the transcription component 302 includes a translation component 312 that translates the transcribed captured media information into one or more other languages. The translation component 312 translates the transcribed text based on user input, a set of preferences, and/or a destination of the message 106. For example, the recipient 118 can have an email address with the domain extension for India (e.g., @domain.in), and the translation component 312 can translate the transcribed text from a captured language to Hindi. As an additional example, the user 104 may natively speak a first language, but desire to send messages to specified recipients in a second language. The user 104 can set a preference that captured media information for the specified recipients be translated into the second language.

The anchor component 304 provides for inclusion, placement, or insertion of an anchor (e.g., place marker, holder, etc.) in the message 106. The anchor is an icon (e.g., identifier, picture, etc.) that when selected (e.g., clicked, moused-over, viewed, etc.) by a message viewer (e.g., recipient 118, user 104, etc.) will initiate playing or exposing the captured media information. For example, the user 104 may include a birthday greeting video (e.g., media information) for the recipient 118 in an email, and desire for the birthday greeting video to be played when the recipient reaches a specific location in the email. The user 104 can insert an anchor for the birthday greeting in the email via the anchor component 304, and when the recipient 118 mouses-over or views the anchor the video greeting can be displayed.

The attachment component 306 appends, affixes, or otherwise attaches the captured media information to the message 106 (e.g., an attachment or inline as an embedded object or a link to a disparate location as described below). For example, the attached captured media information can be attached as a file (e.g., data packet, etc.) that is transmitted along with the message 106. If the captured media information is attached to the message 106, then the recipient 118 can save the file of the captured media information for replay at a later time or on other devices without having to access the message.

The storage component 308 saves, stores, or otherwise maintains the captured media information in a disparate location, and includes access (e.g., via a link, anchor, etc.) to the captured media information in the message 106. The disparate location can include a data store, an internet media hosting website, a cloud, and so forth. For example, the recipient 118 can select a link in the message 106, and captured media information that is maintained in a cloud can be displayed to the user in the message 106, via a user interface associated with the message 106.

The options component 310 provides a set of integration options for the user 104 to set, establish, or otherwise determine a configuration of the message 106. The set of integration options can include, but are not limited to, editing options, playback options for the captured media information, security options, subtitle options, and so forth. The options component 310 can dynamically determine the set of integration options, determine the set of integration options based on a set of predetermined preferences, or determine the set of integration options based on prior usage of the user 104.

Figure 4:
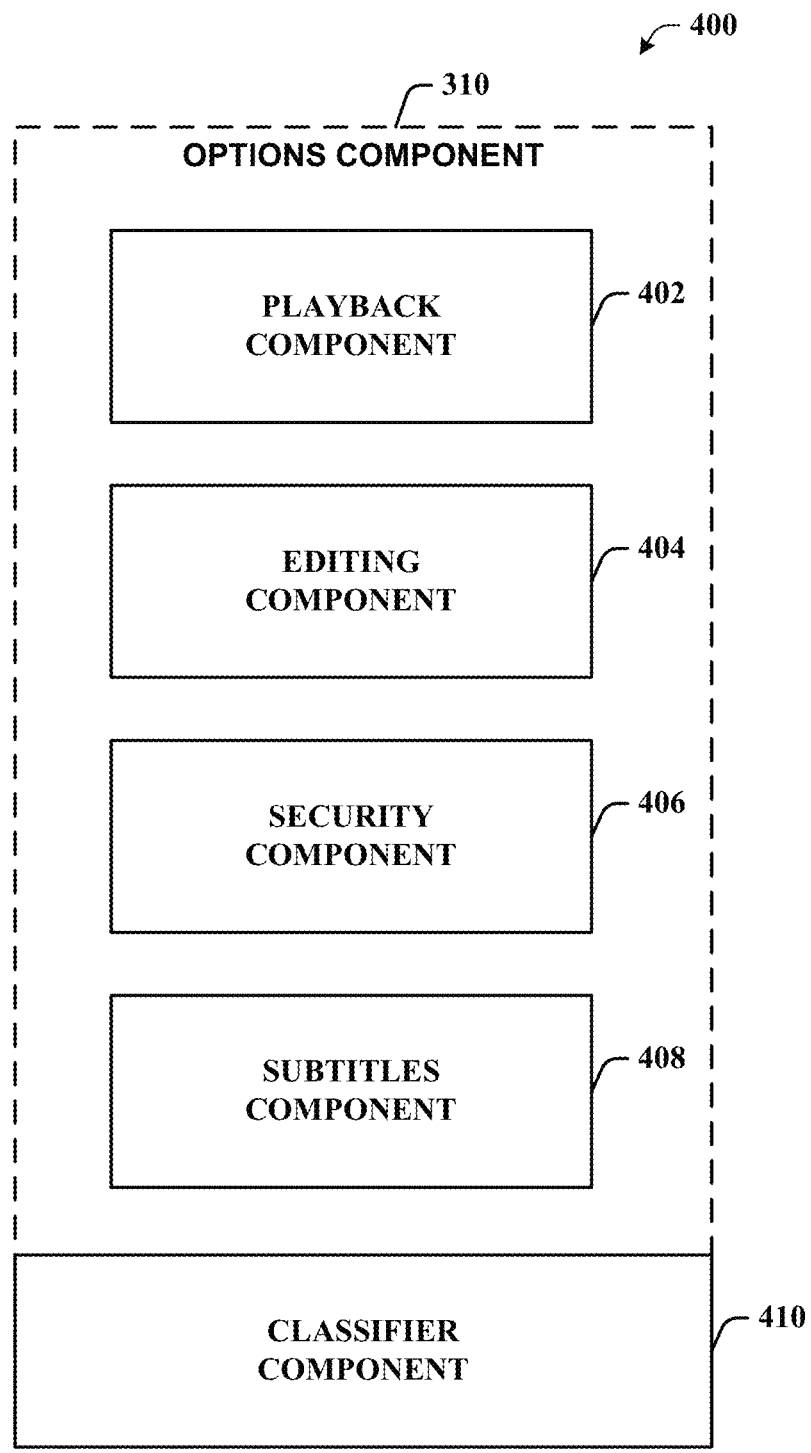
FIG. 4 illustrates an example options component in accordance with various aspects described herein.

Turning now to FIG. 4, illustrated is an example options component 310 in accordance with various aspects described in this disclosure. As discussed, the options component 310 provides a set of integration options for the user 104 to set, establish, or otherwise determine a configuration for integration of the message 106. The options component 310 in FIG. 4 includes a playback component 402, an editing component 404, a security component 406, a subtitles component 408, and a classifier component 410.

The playback component 402 provides for playing (e.g., replaying, playing back, viewing, etc.) the captured media information. In addition, the playback component 402 provides for rewinding, fast forwarding, pausing, or stopping play of the captured media information. For example, the user 104 may have captured audio information (e.g., an audio message) for inclusion in the message 106, and the user 104 can review the audio message by replaying the audio message via the playback component 402. Furthermore, the playback component 402 graphically emphasizes, colorizes, or otherwise highlights, transcribed text corresponding to segments of the captured media information. For example, if the captured media information includes audio information consisting of the user 104 saying "Happy Birthday Rosey," then the playback component 402 can highlight the transcribed word "Rosey", when playing the segment of the captured media information consisting of "Rosey."

The editing component 404 provides for editing of the captured media information. The editing component 404 can provide a set of editing options that enable the user 104 to modify, alter, or otherwise edit the captured media information. The editing options can include, but are not limited to, deleting, cropping, resizing, formatting, recapturing, or virtually any media editing functions. Furthermore, the editing component 404 provides for correcting or editing of transcribed text provided via the transcription component 302. For example, the user 104 can replay the captured media information (as discussed above), and correct text that has been incorrectly transcribed by the transcription component 302 as it is highlighted by the playback component 402. Moreover, the editing component 404 provides for a thumbnail selection by the user 104. For example, if the captured media information is video information (e.g., a video recording), then the user 104 can select a frame (e.g., screen, slide, etc.) from the video information as a thumbnail to be displayed for the captured media information. As an additional example, if the captured media information is audio information, then the user 104 can select a graphic, icon, picture, etc. to be displayed as a thumbnail for the audio information.

The security component 406 provides for setting, establishing, or determining a set of security options. The set of security options can include, but are not limited to, designating the captured media information as public, as private (e.g., allowing only designated recipients to view captured media information), publishing the captured media information via a social networking or internet content website, enabling or disabling forwarding of the captured media information, employing public-key cryptography to restrict access to the captured media information, requiring challenge-response authentication (password, username, etc.) for access to the captured media information, and so forth. In addition, the security component 406 determines an integration technique suitable for the selected privacy settings. For example, if the user elects to make the captured media information public, then the captured media information can be appended to the message as an attachment (e.g., using the attachment component 306). Additionally or alternatively, if the user elects to make the captured media information private, then the captured media information can be stored in a disparate location, and a link to the captured media information can be provided in the message for the intended recipient 118 (e.g., via the storage component 308).

The subtitles component 408 provides for insertion of transcribed text in video information as closed captioning or subtitles. For example, the user 104 can capture video information during generation of the message 106 using a webcam that includes the user 104 singing "Happy Birthday." The user's 104 singing can be transcribed (e.g., by the transcription component 302) to text, and the user 104 can select to include the transcribed text in the video information as subtitles. In addition, the subtitles component 408 provides for translation of the subtitles (e.g., using the translation component 312).

The classifier component 410 infers or determines a classification for the captured media information or transcribed text, and provides a set of content related options based on the classification. The set of content related options can include virtually any options provided via the playback component 402, the editing component 404, the security component 406, or the subtitles component 408. In addition, the set of content related options can include options dynamically generated via the classifier component 410. For example, the classifier component 410 can determine that the captured media information or transcribed text relate to a birthday message, and in response, provide a set of birthday message options. The birthday message options can include a set of birthday message templates, a set of birthday backgrounds, a set of birthday borders, a set of security options commonly selected for birthday messages, and so forth.

Accordingly, in order to provide for or aid in the numerous inferences described herein, the classifier component 410 examines the entirety or a subset of the data available and provides for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is used to develop models of priority.

Figure 5:
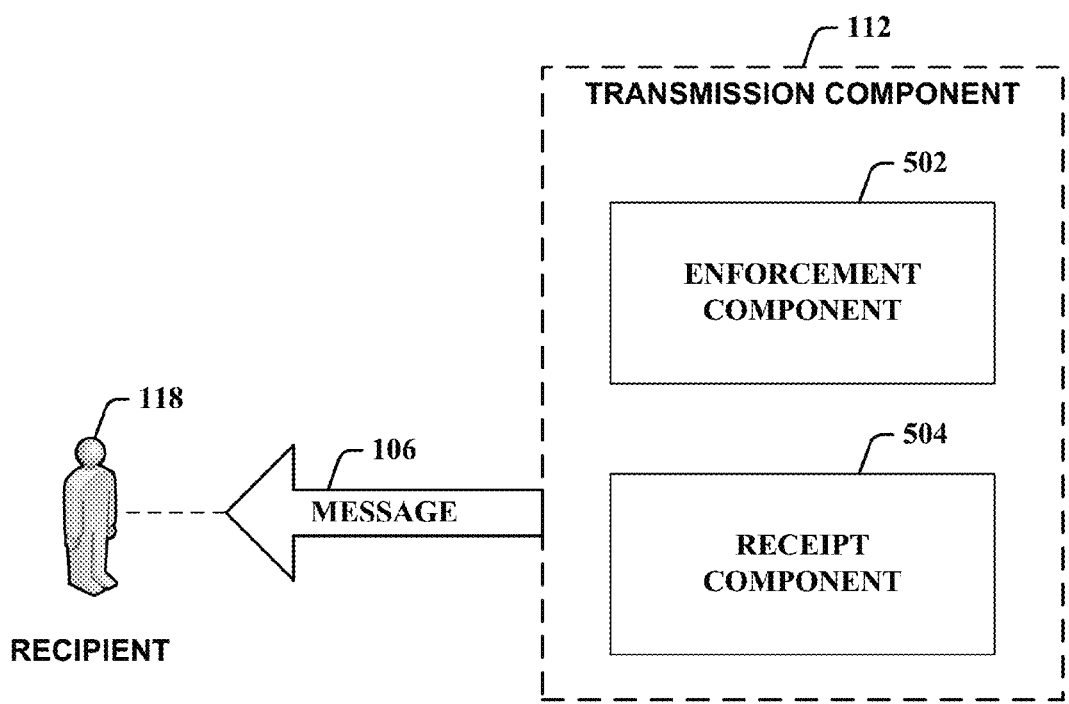
FIG. 5 illustrates an example transmission component in accordance with various aspects described herein.

FIG. 5 illustrates an example transmission component 112 in accordance with various aspects described in this disclosure. As discussed, the transmission component 112 sends the message 106 and the integrated captured media information to one or more recipients 118. The transmission component 112 in FIG. 5 includes an enforcement component 502, and a receipt component 504. The enforcement component 502 ensures compliance with security options set by the user (e.g., via the security component 406). For example, if the user 104 has disabled forwarding of the integrated captured media information, then the enforcement component 502 can remove the integrated captured media information from the message 106, if the message 106 is forwarded to a person other than the intended recipient 118. As an additional example, if access to the integrated captured media information is provided via a link, the enforcement component 502 can detect an internet protocol address (IP address) of the recipient 118, and provide access to the link only for that IP address (e.g., an IP address within an intranet). As further examples, the enforcement component 502 can restrict access to the captured media information by employing public-key cryptography (e.g., public key/private key encryption, etc.), or by requiring the recipient 118 to provide an authorized username and/or password (e.g., challenge-response authentication, etc.). The receipt component 504 sends, communicates, or otherwise transmits a confirmation that the message 106 or integrated captured media information has been viewed by the intended recipient 118.

Figure 6:
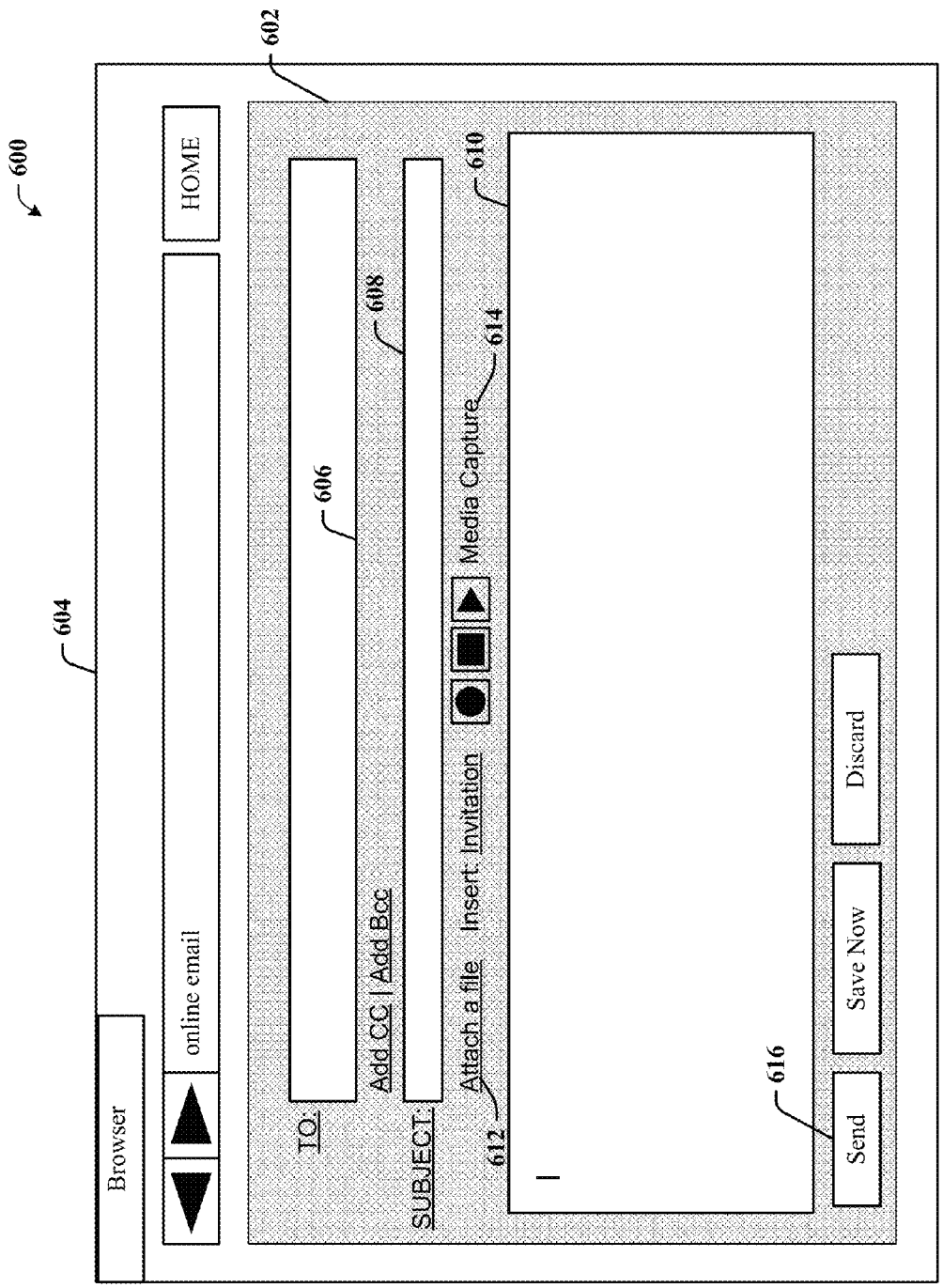
FIG. 6 illustrates a system that provides a non-limiting example of a user interface in accordance with various aspects described herein.

Non-Limiting Examples of a User Interface and Media Capture During Message Generation Referring to FIG. 6, illustrated is a system 600 that provides a non-limiting example of a user interface 602 in accordance with various aspects described herein. The user interface 602 can be an internet email interface displayed via a web browser 604 that provides for generation of an internet email message (e.g., email, message, etc.). The user interface 602 can include an address field 606 (e.g., "TO" field) that provides for receiving user input designating one or more recipients of the message. In addition, the user interface 602 can include a subject field 608 that provides for receiving user input labeling a subject, a caption, or a description of the message. For example, if the user is sending a birthday message to a friend, then the user can enter "Happy Birthday Friend" in the subject field 608.

The user interface 602 also includes a body field 610 that provides for receiving user input for a body of the message. Furthermore, the user interface 602 can include an attach file option 612 that provides for receiving a file that was generated outside of the user interface 602 to attach to the message. For example, the user may have written a report for class using a word processing program. The user can send the previously saved word processing file to a teacher along with the message using the attach file option 612.

Moreover, the user interface 602 includes a media capture section 614 that provides for receiving user input initiating media capture during the generation of the message (e.g., using the media capture component 108). The media information can include, but is not limited to, video information, audio information, or photographic information, and can be captured using virtually any media capture hardware or device, including but not limited to, a microphone, a web cam, a digital camera, a camcorder, and so forth. The set of media capture hardware can be stand-alone hardware, or can be integrated into a user device, such as, a laptop, a desktop computer, a tablet, a net book, a mobile phone, a smart phone, a personal digital assistant (PDA), a portable music player, a video game system, and so forth. It is to be appreciated that although the media capture section 614 is illustrated as being incorporated into an internet email message service, such implementation is not so limited. For instance, the media capture section 614 can be incorporated into a social network messaging interface, a messaging software application, or can be a stand-alone widget for use with other messaging interfaces.

In addition, the user interface 602 includes a send option 616 that provides for receiving user input initiating transmission of the message and the captured media. The message and captured media can be transmitted to the recipients designated in the address field 606, and the captured media can be integrated with the message as an attachment, or inline as an embedded object or link to a disparate location. Additionally or alternatively, the user can save the message for transmission at another time, or delete, cancel, or otherwise discard the message.

Figure 7:
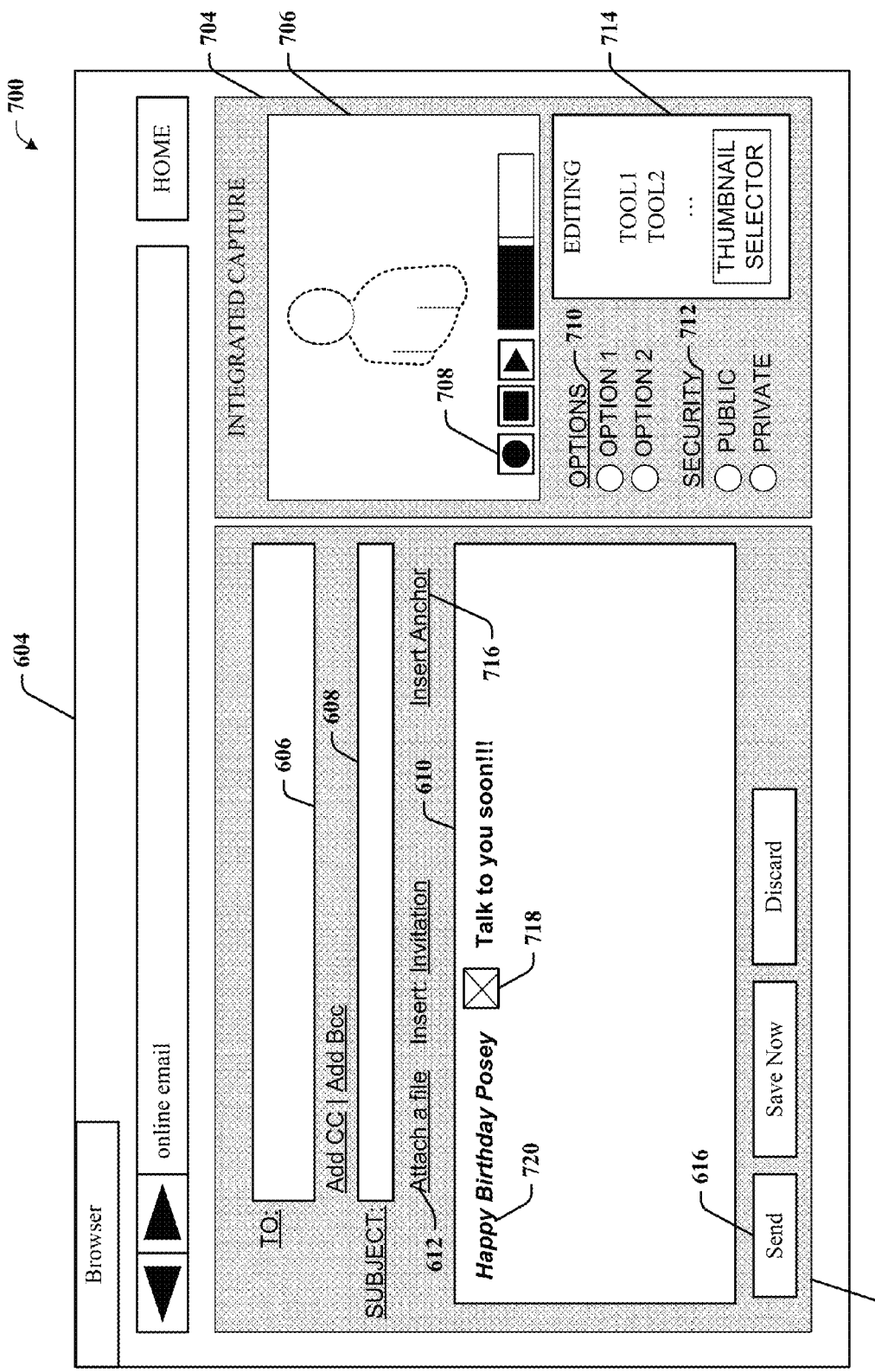
FIG. 7 illustrates a system that provides a non-limiting example of a user interface in accordance with various aspects described herein.

Turning now to FIG. 7, illustrated is a system 700 that provides a non-limiting example of a user interface 702 in accordance with various aspects described herein. Similar to the user interface 602, the user interface 702 can be an internet email interface displayed via web browser 604 that provides for generation of an internet email message (e.g., email, message, etc.). The user interface 702 can include the address field (e.g., "TO") 606 that provides for receiving user input designating one or more recipients of the message, the subject field 608 that provides for receiving user input labeling a subject of the message, and the body field 610 provides for receiving user input for the body of the message.

Additionally, user interface 702 includes a media capture section 704 that provides for receiving user input to capture media information during the generation of the message (e.g., using the media capture component 108), such as video information, audio information, or photographic information. The media capture section 704 includes a media playback section 706 that enables viewing, stopping, capturing (e.g., recording), and so forth of captured media information via a set of media capture options 708. The capturing encodes the video in a format viewable by an anticipated client (e.g., viewable in a web browser). Moreover, the media capture section 704 includes a set of options 710 for the captured media information. For example, the set of options can be generated based on the content of the message (e.g., using the classifier component 410). For instance, if the captured media information relates to a birthday message, then the set of options 710 can include a set of birthday message templates, a set of birthday backgrounds, a set of birthday borders, a set of security options 712 commonly selected for birthday messages, and so forth.

The media capture section 704 can also include a set of editing options 714 that enable the user to edit the captured media information. The set of editing options 714 can include deleting, cropping, resizing, formatting, recapturing (e.g., rerecording), or virtually any media editing functions. In addition, the set of editing options 714 can enable the user to select a thumbnail for the captured media. For example, if the captured media information includes video information, then the set of editing options 714 can enable the user to select a frame (e.g., screen, slide, etc.) from the video information as a thumbnail to be displayed for the captured media information, or if the captured media information includes audio information, then the user can select a graphic, icon, picture, etc. to be displayed as a thumbnail for the audio information.

Furthermore, the user interface 702 includes an insert anchor option 716 that provides for receiving user input to insert an anchor 718 (e.g., place marker, holder, etc.) into the body field 610 for the message (e.g., using the anchor component 304). The anchor 718 is an icon (e.g., identifier, picture, thumbnail, etc.) that when selected (e.g., clicked, moused-over, viewed, etc.) by a message viewer will initiate playing or exposing the captured media information. For example, the user can include a birthday greeting video (e.g., captured media information) for the recipient in the message, and may desire for the birthday greeting video to be played when the recipient is reading at a specific location in the message. The user can select the insert anchor option 716, and insert the anchor 718 for the birthday greeting in the message, and when a viewer (e.g., recipient, reader, etc.) clicks, mouses-over, or otherwise selects the anchor 718 the birthday greeting video can be displayed in replay section (not shown) similar to the media capture section 704.

Moreover, the captured media information can be transcribed to the body field 610 (e.g., using the transcription component 302). For example, if the user captures media information consisting of the user saying "Happy Birthday Posey," then the text "Happy Birthday Posey" (e.g., transcribed text 720) can be transcribed to the body field 610. The user can edit the transcribed text 720 using the functions of the body field 610. For example, the user can edit the transcribed text in a manner the user would typically edit text entered in the body field 610.

Non-Limiting Examples of Methods for Media Capture During Message Generation

Figure 8:
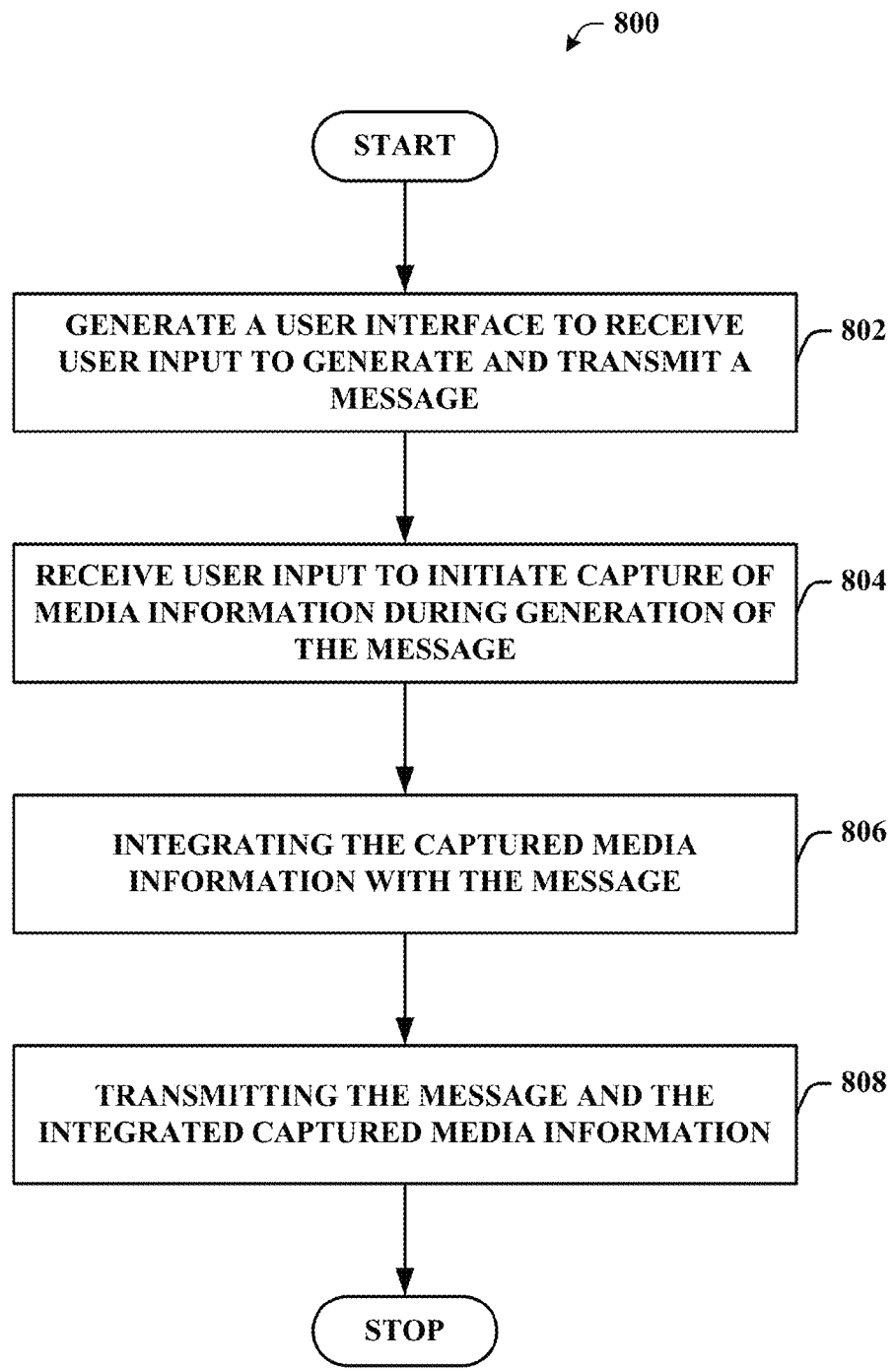
FIGS. 8-9 are example flow diagrams of respective methods for media capture during message generation in accordance with various aspects described herein.
Figure 9:
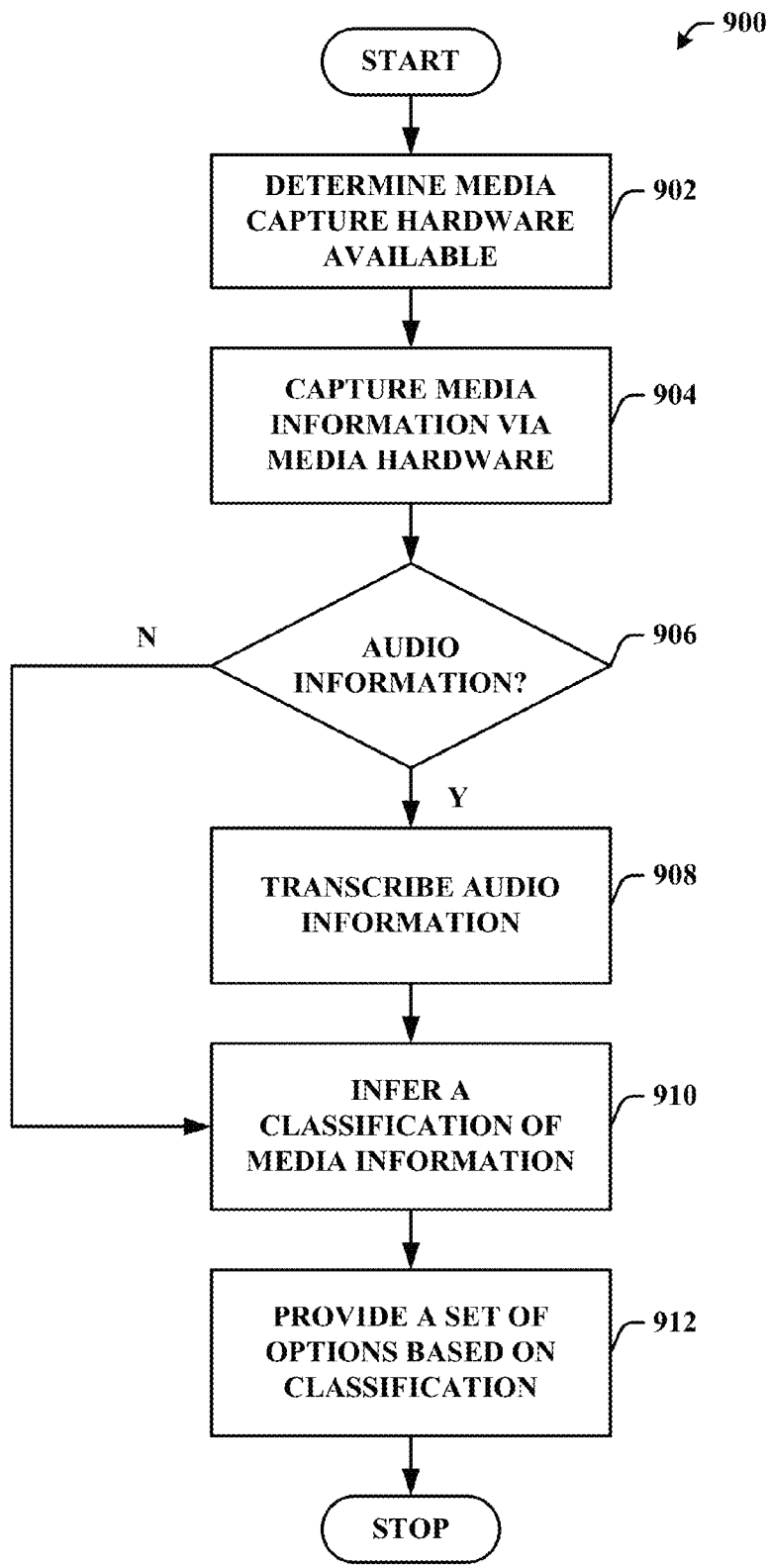

FIGS. 8-9 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 8, illustrated is an example methodology 800 for media capture during message generation in accordance with various aspects described in this disclosure. At reference numeral 802, a user interface is generated to receive user input to generate and transmit a message (e.g., by the communications component 102). For example, the message (e.g., message 106) can include, but is not limited to, an electronic mail message (email), an instant message, or a social networking message (e.g., private message, profile message, status message, update, stream, etc.). In addition, the user interface (e.g., user interface 602-702) can be generated via an online application, or a stand-alone application.

At reference numeral 804, user input is received to initiate capture of media information during generation of the message (e.g., using the media capture component 108). The user input can include explicit user input (e.g., configuration selections, question/answer) such as from mouse selections, keyboard selections, speech, and so forth. The media information can include, but is not limited to, video information, audio information, or photographic information.

At reference numeral 806, captured media information is integrated with the message (e.g., by the integration component 110). For example, the captured media information can be attached to the message (e.g., by the attachment component 306), or can be stored, saved, or otherwise maintained in a disparate location (e.g., by the storage component 308), wherein access to the captured media information is provided (e.g., via a hyperlink, etc) in the message. Additionally or alternatively, an anchor (e.g., anchor 718) can be inserted (e.g., using the anchor component 304) in the message that when selected (e.g., clicked, moused-over, viewed, etc.) will initiate playing or exposing the captured media information.

At reference numeral 808, the message and the integrated captured media information are transmitted (e.g., via the transmission component 112) to one or more recipients. The recipients are designated by the user. For example, the user can direct, address, or otherwise send an email to the one or more recipients. As an additional example, the user can broadcast, post, or otherwise send a social networking messaging to a set, group, circle, etc. of recipients.

Turning to FIG. 9, illustrated is an example methodology 900 for media capture during message generation in accordance with various aspects described in this disclosure. At reference numeral 902, a set of available media capture hardware is determined (e.g., by the hardware identification component 202). For example, a webcam, a configuration of the webcam, and a set of protocols for communication with the webcam, can be determined. The available media capture hardware can be dynamically determined, determined based on user input, or determined based on prior use or a set of user preferences. For example, the available media capture hardware can be determined by comparison with a set of known media capture devices, and identified based at least in part on the comparison.

At reference numeral 904, the media information is captured using the determined media capture hardware (e.g., by the acquisition component 204). For example, audio information can be captured (e.g., recorded, etc.) using a microphone included in the set of determined media capture hardware, video information can be captured via a webcam included in the set of determined media capture hardware, or a photograph can be captured using a digital camera included in the set of determined media capture hardware.

At reference numeral 906, a determination is made whether there is audio information included in the captured media information (e.g., by the transcription component 302). For example, the captured media information can include audio information (e.g., an audio recording), or video information (e.g., a video recording) having an audio layer. If there is audio information included in the captured media information (Y at reference numeral 906), then at reference numeral 908 the audio information is transcribed (e.g., using the transcription component 302). For instance, a user can initially generate an email by typing a message, and at a first point in the email initiate capture of audio information (e.g., a voice message). The voice message can be transcribed, and the transcribed text can be included in the email at the first point.

In addition, the transcribed text can be translated based on user input, a set of preferences, or a destination of the message (e.g., by the translation component 312). For example, a recipient can have an email address with an Indian domain extension (e.g., @domain.in), and the transcribed text can be translated from a captured language to Hindi. As an additional example, the user may natively speak a first language, but desires to send messages to specified recipients in a second language. The user can establish a set a preferences that captured media information for the specified recipients be translated into the second language. Returning to reference numeral 906, if audio information is not included in the captured media information (N at reference numeral 906), then the methodology advances to reference numeral 910.

At reference numeral 910, a classification of the captured media information is determined or inferred (e.g., by the classifier component 410). For example, it can be inferred that the captured media information relates to a birthday message. At reference numeral 912, a set of options are provided based on the classification (e.g., by the classifier component 912). The options can include a set of playback options (e.g., using the playback component 402), a set of editing options (e.g., using the editing component 404), a set of security options (e.g., using the security component 406), or a set of subtitle options (e.g., using the subtitles component 408). As an example, where the captured media information in the previous example is classified as relating to a birthday message, a set of birthday message options can be provided, including a set of birthday message templates, a set of birthday backgrounds, a set of birthday borders, a set of security options commonly selected for birthday messages, and so forth.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of this disclosure.

Figure 10:
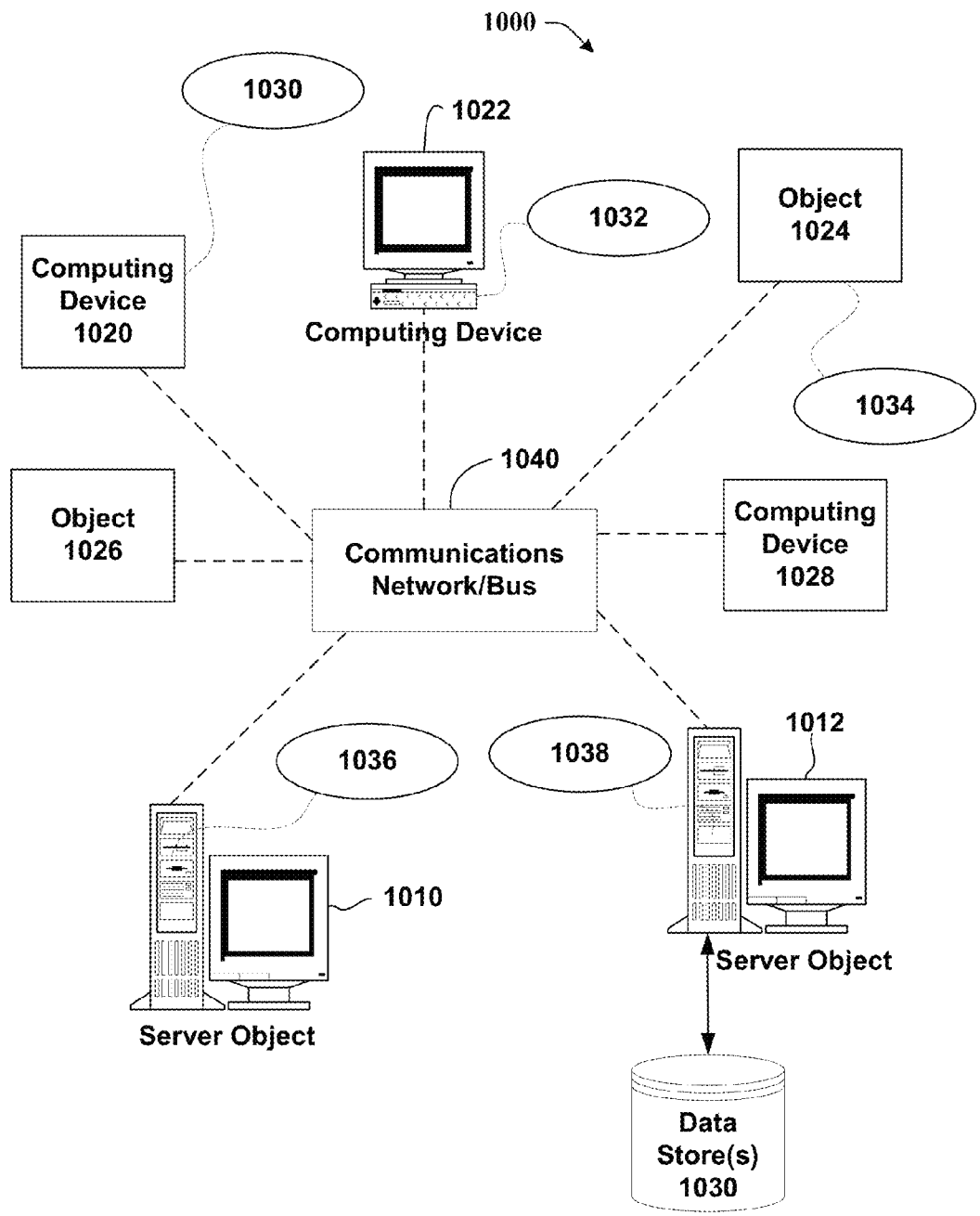
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal data assistants (PDAs), audio/video devices, mobile phones, MP3 players, personal computers, tablets, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the smooth streaming provided in accordance with various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1040 is the Internet, for example, the computing objects 1010, 1012, etc. can be Web servers with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 11 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 11:
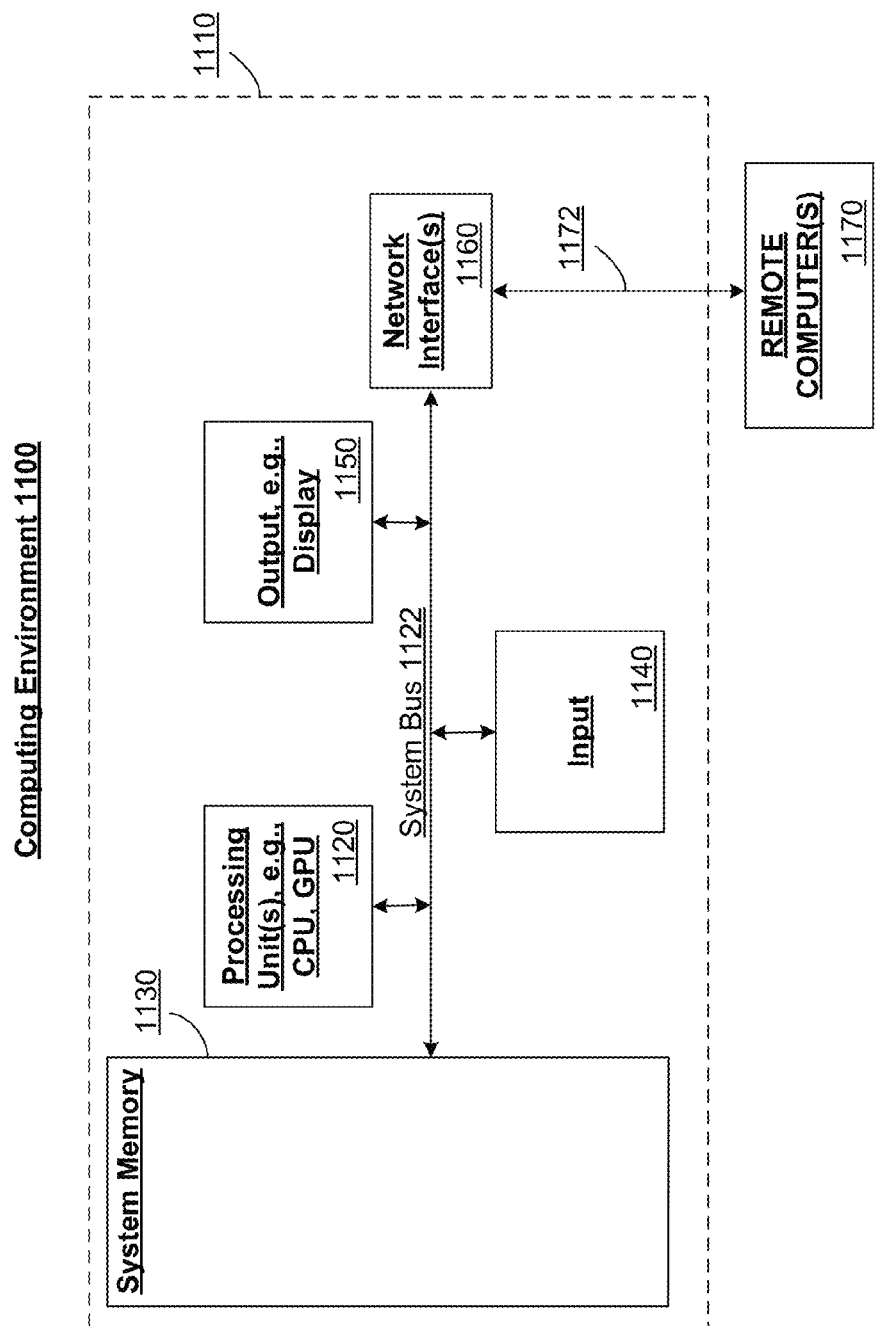
FIG. 11 is a block diagram representing an exemplary non-limiting computing system or operating environment in which the various embodiments may be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into the computer 1110 through input devices 1140. The A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments and implementations have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
a memory storing computer executable components; and
a processor configured to execute the following computer executable components stored in the memory:
a communications component configured to generate a user interface configured to receive user input to generate a message, the user interface comprising:
a text message entry element configured to accept text input for inclusion in the message, and a media capture element configured to create a live media recording during generation of the message for inclusion in the message;

a media capture component configured to receive the user input indicating selection of the media capture element to initiate creation of the live media recording during the generation of the message;

an integration component configured to integrate the live media recording with the message; and a transmission component configured to transmit the message with the integrated live media recording.

2. The system of claim 1, further comprising:

a hardware identification component configured to determine availability of at least one of a video capture hardware, an audio capture hardware, or a photo capture hardware; and wherein the media capture component is further configured to at least one of:

employ the video capture hardware to create the live media recording including a video recording in response to a determination that the video capture hardware is available, employ the audio capture hardware to create the live media recording including a audio recording in response to a determination that the audio capture hardware is available, or employ the photo capture hardware to create the live media recording including a photo recording in response to a determination that the photo capture hardware is available.

3. The system of claim 2, wherein the hardware identification component determines the availability of the video capture hardware, the audio capture hardware, or the photo capture hardware based upon at least one of a previous message generation or an analysis of hardware available.

4. The system of claim 2, wherein the media capture component is further configured to encode the live media recording in a format corresponding to a recipient of the message.

5. The system of claim 1, further comprising a transcription component configured to transcribe an audio recording included in the live media recording to text, and insert the transcribed text into the message.

6. The system of claim 5, further comprising a playback component configured to highlight segments of the transcribed text corresponding to segments of the audio recording during playback of the audio recording.

7. The system of claim 5, further comprising an editing component configured to provide for editing of the transcribed text.

8. The system of claim 5, further comprising a classifier component configured to determine or infer a classification of the transcribed text, and provide a set of integration options based at least in part on the classification.

9. The system of claim 1, further comprising a classifier component configured to determine or infer a classification of the created live media recording and provide a set of integration options based at least in part on the classification.

10. The system of claim 9, wherein the live media recording includes at least one of a video recording for inclusion in the message, an audio recording for inclusion in the message, or a photo for inclusion in the message.

11. The system of claim 1, wherein the message is at least one of an electronic mail, an instant message, or a social network message.

12. The system of claim 1, further comprising an anchor component configured to accept additional user input specifying an anchor location in the message where the live media recording is to be placed.

13. The system of claim 1, further comprising a playback component configured to automatically initiate playback of the live media recording in response to scrolling the message to the anchor location.

14. A method, comprising:

generating, by a device including a processor, a user interface to receive user input to generate a message, the user interface comprising:

a text message entry element for accepting text input for inclusion in the message, and a media capture element for generating a live media recording during generation of the message for inclusion in the message;

receiving the user input indicating selection of the media capture element and initiating the generating of the live media recording during the generation of the message;

integrating the live media recording with the message; and transmitting the message with the integrated live media recording.

15. The method of claim 14, further comprising:

determining availability of at least one of a video capture hardware, an audio capture hardware, or a photo capture hardware; and at least one of:

employing the video capture hardware to generate the live media recording including a video recording in response to a determination that the video capture hardware is available, employing the audio capture hardware to generate the live media recording including a audio recording in response to a determination that the audio capture hardware is available, or employing the photo capture hardware to generate the live media recording including a photo recording in response to a determination that the photo capture hardware is available.

16. The method of claim 15, wherein the determining the availability of the video capture hardware, the audio capture hardware, or the photo capture hardware is based upon at least one of a previous message generation or an analysis of hardware available.

17. The method of claim 14, further comprising transcribing an audio recording to text, and inserting the transcribed text into the message.

18. The method of claim 17, further comprising highlighting segments of the transcribed text corresponding to sections of the audio recording included in the live media recording.

19. The method of claim 17, further comprising determining or inferring a classification of the transcribed text, and providing a set of integration options via the user interface based on the classification.

20. The method of claim 19, wherein the live media recording includes at least one of a video recording for inclusion in the message, an audio recording for inclusion in the message, or a photo for inclusion in the message.

21. The method of claim 14, further comprising determining or inferring a classification of the live media recording, and providing a set of integration options via the user interface based on the classification.

22. The method of claim 14, further comprising encoding the live media recording in a format corresponding to an available client of a recipient of the message.

23. A non-transitory computer-readable medium having instructions stored thereon that, in response to execution, cause a device including a processor to perform operations comprising:
- producing a user interface to receive user input to generate a message, the user interface comprising:
    - a text message entry element for accepting text input for inclusion in the message, and
    - a media capture element for capturing a live media recording during generation of the message for inclusion in the message;
- receiving the user input indicating selection of the media capture element and initiating the capturing of the live media recording during the generation of the message;
- integrating the live media recording with the message; and
- transmitting the message with the integrated live media recording.

24. The non-transitory computer-readable medium of claim 23, the operations further comprising:
- determining availability of at least one of a video capture hardware, an audio capture hardware, or a photo capture hardware; and at least one of
    - employing the video capture hardware to capture the live media recording including a video recording in response to a determination that the video capture hardware is available,
    - employing the audio capture hardware to capture the live media recording including a audio recording in response to a determination that the audio capture hardware is available, or
    - employing the photo capture hardware to capture the live media recording including a photo recording in response to a determination that the photo capture hardware is available.

25. The non-transitory computer-readable medium of claim 24, wherein the determining the availability of the video capture hardware, the audio capture hardware, or the photo capture hardware is based upon a previous message generation.

26. The non-transitory computer-readable medium of claim 24, wherein the determining the availability of the video capture hardware, the audio capture hardware, or the photo capture hardware is based upon an analysis of hardware available in the device.

* * * * *